(12) United States Patent
Melika et al.

(10) Patent No.: US 11,694,169 B2
(45) Date of Patent: *Jul. 4, 2023

(54) SYSTEM AND METHOD FOR RENDERING VIRTUAL CURRENCY RELATED SERVICES

(71) Applicant: OX Labs Inc., Los Angeles, CA (US)

(72) Inventors: George Melika, Los Angeles, CA (US); Akbar Thobhani, South San Francisco, CA (US)

(73) Assignee: OX Labs Inc., Los Angeles, CA (US)

( * ) Notice: Subject to any disclaimer, the term of this patent is extended or adjusted under 35 U.S.C. 154(b) by 728 days.

This patent is subject to a terminal disclaimer.

(21) Appl. No.: 16/442,754

(22) Filed: Jun. 17, 2019

(65) Prior Publication Data

US 2019/0325405 A1  Oct. 24, 2019

Related U.S. Application Data

(63) Continuation of application No. 14/802,018, filed on Jul. 17, 2015, now Pat. No. 10,489,757, which is a continuation-in-part of application No. 14/714,142, filed on May 15, 2015, now abandoned.

(60) Provisional application No. 62/000,386, filed on May 19, 2014.

(51) Int. Cl.
*G06Q 20/06* (2012.01)
*G06Q 20/38* (2012.01)
*G06Q 20/36* (2012.01)
*G06Q 50/00* (2012.01)

(52) U.S. Cl.
CPC ....... *G06Q 20/065* (2013.01); *G06Q 20/0658* (2013.01); *G06Q 20/36* (2013.01); *G06Q 20/3678* (2013.01); *G06Q 20/382* (2013.01); *G06Q 20/3829* (2013.01); *G06Q 50/01* (2013.01); *G06Q 2220/00* (2013.01)

(58) Field of Classification Search
CPC .. G06Q 20/065; G06Q 20/0658; G06Q 20/36; G06Q 20/3678; G06Q 20/382; G06Q 20/3829; G06Q 50/01; G06Q 2220/00; G06Q 20/326; G06Q 20/3267; G06Q 20/384
See application file for complete search history.

(56) References Cited

U.S. PATENT DOCUMENTS

| | | | | |
|---|---|---|---|---|
| 5,416,841 A | * | 5/1995 | Merrick | H04L 9/0894 380/1 |
| 5,544,246 A | * | 8/1996 | Mandelbaum | G06Q 20/3576 705/65 |
| 5,884,288 A | | 3/1999 | Chang et al. | |

(Continued)

OTHER PUBLICATIONS

Skudnov ("Bitcoin Clients", published Mar. 6, 2012) (Year: 2012).*

(Continued)

*Primary Examiner* — Steven S Kim
*Assistant Examiner* — Jason B Fenstermacher
(74) *Attorney, Agent, or Firm* — Cognition IP, P.C.; Edward Steakley; Saleh Kaihani

(57) ABSTRACT

Technique introduced here relates to virtual currency related services, and more specifically, to tools for providing crypto or other digital currency (e.g. bitcoin) related services, including bitcoin DNS service, sending bitcoins over social media communication networks, a bitcoin trading platform and secure storage services for bitcoin.

27 Claims, 13 Drawing Sheets

(56) References Cited

U.S. PATENT DOCUMENTS

| | | | |
|---|---|---|---|
| 5,991,750 A | 11/1999 | Watson | |
| 6,715,672 B1* | 4/2004 | Tetro | G06Q 20/04 235/379 |
| 7,234,063 B1* | 6/2007 | Baugher | H04L 9/0833 380/259 |
| 7,568,114 B1* | 7/2009 | Schlafly | G06Q 20/382 705/64 |
| 7,653,597 B1* | 1/2010 | Stevanovski | G06Q 20/02 705/40 |
| 7,660,768 B2 | 2/2010 | Beck et al. | |
| 7,827,098 B2* | 11/2010 | Hasumi | G06Q 20/4016 705/38 |
| 2002/0062278 A1* | 5/2002 | Ingram | G06Q 20/10 705/39 |
| 2002/0111907 A1* | 8/2002 | Ling | G06Q 20/29 705/41 |
| 2002/0165828 A1* | 11/2002 | Sakamoto | G06Q 20/382 705/64 |
| 2002/0178122 A1* | 11/2002 | Maes | G06Q 20/383 705/64 |
| 2004/0236941 A1* | 11/2004 | Sanchez | H04L 63/0428 713/155 |
| 2005/0220095 A1* | 10/2005 | Narayanan | H04L 69/22 370/389 |
| 2006/0225126 A1* | 10/2006 | Brown | H04L 63/062 726/2 |
| 2007/0165843 A1 | 7/2007 | Lauter | |
| 2009/0199303 A1* | 8/2009 | Ahn | H04L 9/083 726/27 |
| 2010/0121767 A1* | 5/2010 | Coulter | G06Q 20/382 705/67 |
| 2011/0213711 A1 | 9/2011 | Skinner et al. | |
| 2012/0158589 A1 | 6/2012 | Katzin et al. | |
| 2013/0036058 A1 | 2/2013 | Kelly | |
| 2013/0133038 A1 | 5/2013 | Deluca et al. | |
| 2013/0157618 A1 | 6/2013 | Billau | |
| 2013/0173416 A1 | 7/2013 | Glasgow et al. | |
| 2014/0032298 A1 | 1/2014 | Corrie et al. | |
| 2014/0100985 A1 | 4/2014 | Lenahan et al. | |
| 2015/0228004 A1 | 8/2015 | Bednarek et al. | |
| 2015/0269538 A1 | 9/2015 | Stanchfield | |
| 2015/0287026 A1 | 10/2015 | Yang | |
| 2015/0332224 A1 | 12/2015 | Melika et al. | |
| 2021/0312431 A1 | 10/2021 | Ravinathan | |

OTHER PUBLICATIONS

A. Antonopoulos, "Mastering Bitcoin: Unlocking Digital Crypto-Currencies," O'Reilly Media, Inc., Dec. 2014, pp. 1-262.

European Central Bank, "Virtual Currency Schemes," [online], ISBN 978-92-899-0862-7, Available from: http://www.ecb.europa.eu/pub/pdf/other/virtualcurrencyschemes201210en.pdf., Oct. 2012, pp. 1-53.

Final Office Action dated Dec. 16, 2015, for U.S. Appl. No. 14/714,142 of Melika, G. et al. filed May 5, 2015.

Non-Final Office Action dated Apr. 12, 2016, for U.S. Appl. No. 14/805,325 of Melika, G. et al. filed Jul. 21, 2015.

U.S. Appl. No. 14/172,589 of Belshe, M.A. et al. filed Feb. 4, 2014.

U.S. Appl. No. 14/805,325 of Melika, G. et al. filed Jul. 21, 2015.

Non-Final Office Action dated Jul. 30, 2015, for U.S. Appl. No. 14/172,589 of Belshe, M.A. et al. Feb. 4, 2014.

Coinbase, Secure Bitcoin Storage, 2014.

* cited by examiner

FIG. 4

SYSTEM AND METHOD FOR RENDERING VIRTUAL CURRENCY RELATED SERVICES

CROSS-REFERENCE TO RELATED APPLICATION

This application is a continuation of U.S. application Ser. No. 14/802,018, filed Jul. 17, 2015, which is a continuation in part of U.S. application Ser. No. 14/714,142, filed May 15, 2015, which claims benefit of U.S. Provisional Application No. 62/000,386 filed May 19, 2014, which are all hereby incorporated by reference in their entirety.

TECHNICAL FIELD

At least one embodiment of the technique introduced here relates to virtual currency related services, and more particularly, to tools for providing crypto or other virtual currency (e.g. bitcoin) related services, including a bitcoin DNS service, a service for sending bitcoins using social media, a bitcoin trading platform and a secure bitcoin storage service.

BACKGROUND

A virtual currency is a type of unregulated, digital money, which is issued and usually controlled by its developers, and used and accepted among the members of a specific virtual community. The US Department of Treasury defines it as "a medium of exchange that operates like a currency in some environments, but does not have all the attributes of real currency". Digital currency is a form of virtual currency or medium of exchange that is electronically created and stored. Some digital currencies are crypto currencies, for example Bitcoin; others are not, like the Ven. Like traditional money these currencies can often be used to buy physical goods and services. The virtual currency can be decentralized, as for example Bitcoin. A decentralized currency is defined by the US Department of Treasury as a "currency
  (1) that has no central repository and no single administrator, and (2) that persons may obtain by their own computing or manufacturing effort". Trust in the currency is based on the "transaction ledger which is cryptographically verified, and jointly maintained by the currency's users".

Bitcoins are created by a process called mining, in which computer network participants, i.e., users who provide their computing power, verify and record payments into a public ledger in exchange for transaction fees and newly minted bitcoins. Users send and receive bitcoins using wallet software on a personal computer, mobile device, or a web application. Bitcoins can be obtained by mining or in exchange for products, services, or other currencies. The bitcoins market currently suffers from volatility, limiting bitcoins to act as a stable store of value. Where people are allowed to buy in bitcoins, prices are denominated in flat currency at the amount of bitcoins paid is determined by the prevailing exchange rate. Some studies suggest that bitcoin is over 7 times as volatile as gold. However, bitcoin as a form of payment for products and services has seen growth, and merchants have an incentive to accept the currency because transaction fees are lower than that typically imposed by credit card processors.

Cryptocurrency digital wallets are often connected to a public-private key pair. The public key is effectively an address of the digital wallet, and the private key is access to that wallet. When a user loses the private key, the user then loses all access to the digital wallet. When another person gains access to the private key, that person has full access to the digital wallet.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. In the drawings:

FIG. 4 is an example of a GUI illustrating sending a bitcoin or a portion thereof via a tweet in Twitter.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments described are not necessarily mutually exclusive.

Introduced here is a technology directed to tools for providing bitcoin related services ("the technology"). The tools for providing bitcoin related services (hereinafter referred to as "bitcoin application") can be implemented in a number of configurations, e.g., as an online application that can be accessed via a communication network such as Internet, or an application that can be downloaded to and executed on user devices. The user devices can include devices such as a desktop computer; mobile devices such as a mobile phone, a smartphone, a tablet, a laptop; or other computing devices that are capable of executing mobile applications. Further, the bitcoin application can be accessed on various operating systems, including iOS, Mac, Android, and Windows.

The following paragraphs describe the technology with respect to bitcoins. However, it should be noted that the technology is not limited to bitcoins, and is applicable to any virtual currency in general.

Bitcoin DNS Service

Figure 1:
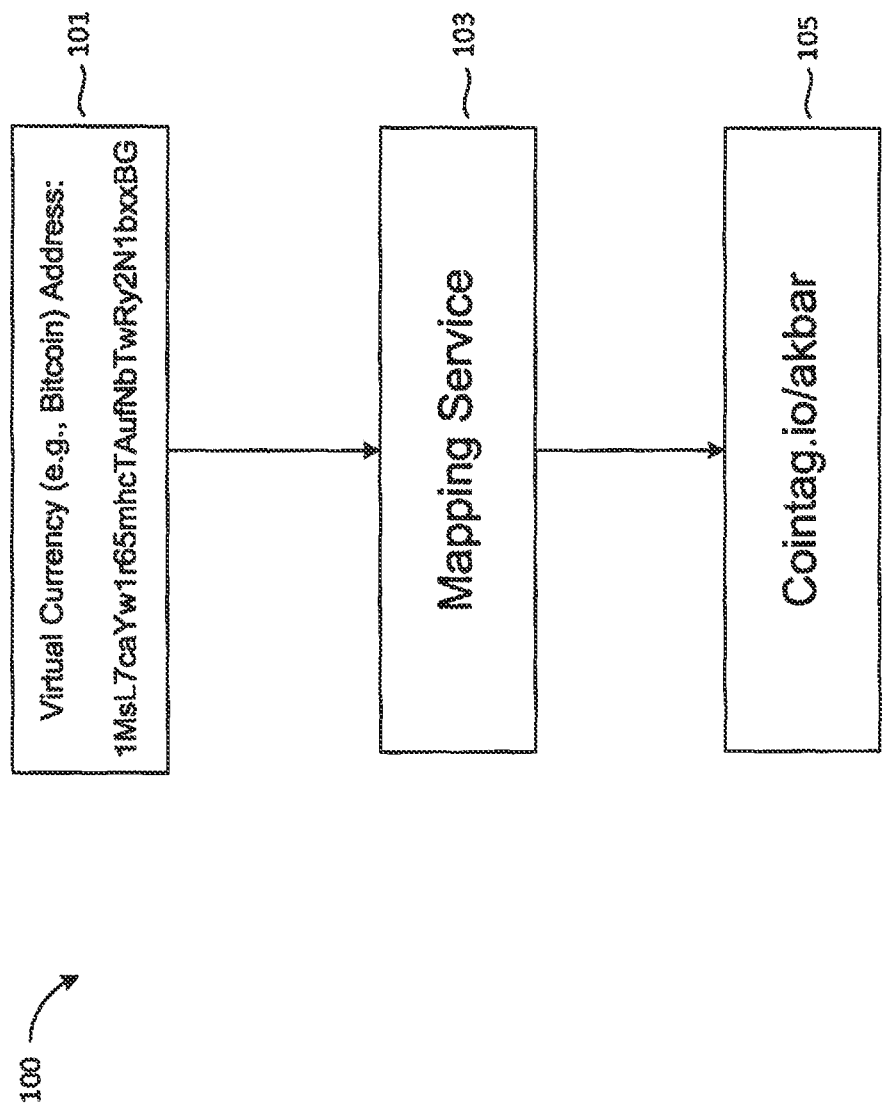
FIG. 1 is a flowchart of a process for rendering bitcoin Domain Name System (DNS) service.

FIG. 1 is a flowchart of a process 100 for rendering bitcoin DNS service. Bitcoin transactions are performed using wallets, e.g., a digital wallet or a paper wallet. A digital wallet refers to an electronic device that allows an individual to make electronic commerce transactions. A user associated with a digital wallet performs transactions such as sending and/or receiving bitcoins. The wallet can be an application running on the user's computer, a mobile app, a service offered by a website. The wallet adds a transaction to a public ledger of the bitcoin network by informing a single node on the Bitcoin network. Regardless of the types of the wallets, the purpose of any wallet includes storing private keys of the user, sending bitcoins to other people, generating addresses, so that the user can receive bitcoins from other people, and viewing transaction history and current balance. A Bitcoin address, or simply address, is an identifier that represents a possible destination for a Bitcoin payment. Addresses can be generated by any user of Bitcoin. It is also possible to get a Bitcoin address using an account at an exchange or online wallet service. An example of a Bitcoin address is "3J98t1WpEZ73CNmQviecrnyiWrnqRhWNLy."

In a computer network, host computers typically communicate between each other using IP (Internet Protocol) addresses of the host computers. While the host computers are efficient with numbers, humans on the other hand typically work better with names. For this reason, the Transmission Control Protocol and the IP (TCP/IP) includes the DNS to link IPs with names of host computers, referred to as hostnames. In some embodiments, a DNS is a distributed database of computers that is responsible for resolving hostnames against IP addresses and vice-versa.

Referring back to the FIG. 1, a process 100 for rendering bitcoin DNS service. The bitcoin DNS service allows mapping of address of a user (e.g., 1MsL7caYw1r65mhcTAufNbTwRy2N1bxxBG in FIG. 1) with a name, e.g., name of the user, to generate a bitcoin hostname that represents the address of the user. An example of the bitcoin hostname for a user with name "akbar" can be "Cointag.io/akbar" as illustrated in FIG. 1. A user can send bitcoins to other users using the bitcoin hostname instead of the address. It is more convenient and less burdensome for a user to remember a hostname than the bitcoin address, which is typically very long. The bitcoin DNS service can save the user from the burden of remembering the long bitcoin addresses and also minimizes any human error that may be caused in reproducing or typing such long addresses.

The bitcoin DNS service can be implemented using either a centralized server or distributed (i.e., decentralized) system. Decentralized server systems are created to circumvent the necessity and avoid the costs of having a central entity checking and validating each transfer. Centralized server typically relies on a central entity to validate a transfer request made by a user e.g., via identification and authentication of the user. On the other hand, decentralized electronic transfer systems rely on identification and publication of user accounts and electronic transfers to validate a transfer request, thereby the public can access all transfers and check the correctness of such transfers in such decentralized systems. This form of crowd-based transfer control, combined with mechanisms to reject incorrect published transfers, form the backbone of most decentralized electronic transfer system. The decentralized electronic transfer system enables users to remain anonymous in each transfer.

A bitcoin DNS service can be implemented using such a decentralized system. For example, various companies can keep a copy of the entire database of name-address mapping. In some embodiments, the mapping information can be stored in the bitcoin block chain and or other similar distributed systems. In some embodiments, distributed systems (such as a block chain or equivalent) can be created for generating bitcoin hostnames, that is, name-address mapping. In some embodiments, the bitcoin DNS service includes a search feature to find the bitcoin hostnames. For example, a user can find a bitcoin hostname using a portion of the bitcoin hostname (which is typically a name of the user or a series of characters preferred by the user) or the user's address, e.g., bitcoin address.

The bitcoin DNS service can be monetized in various ways. For example, one can monetize the bitcoin DNS service by charging for registration of bitcoin host name, that is, for creating the name-address mapping. In another example, the bitcoin DNS service can be monetized by charging an entity, e.g., a person/company/system, requesting to resolve the name-address mapping to pay an entity that services the translation request. In some embodiments, payment of the charge can be done in currency or crypto currency.

Figure 2:
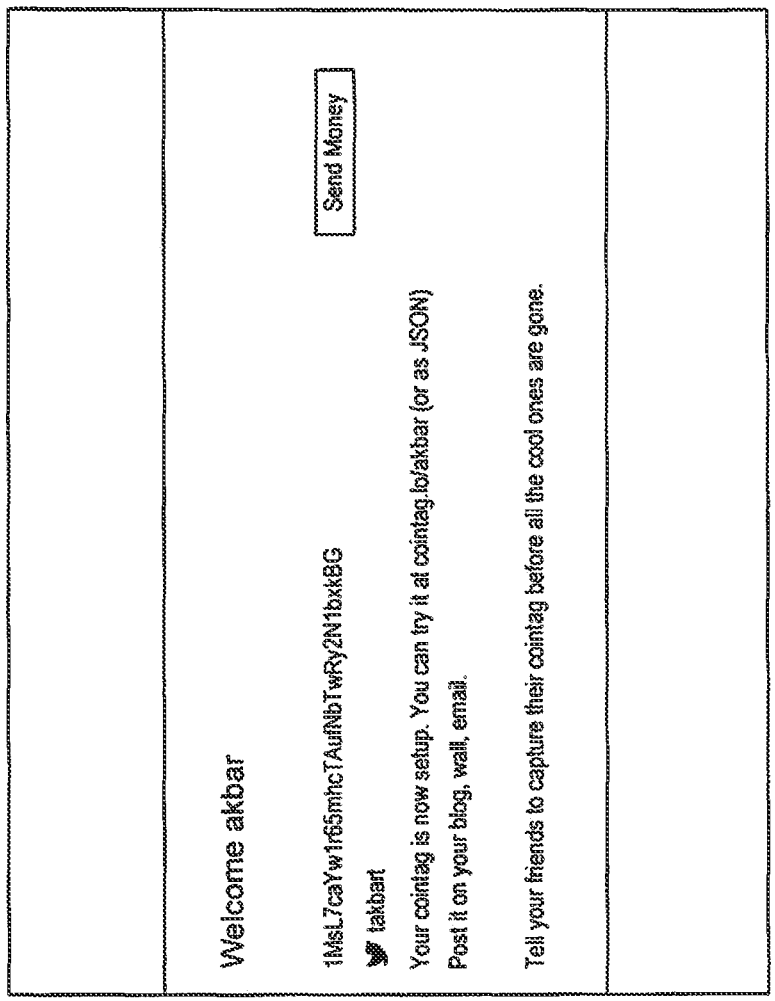
FIG. 2 is an example of a graphical user interface (GUI) illustrating a bitcoin hostname generated using a bitcoin DNS service of FIG. 1.

FIG. 2 is an example of a graphical user interface (GUI) illustrating a bitcoin hostname generated using a bitcoin DNS service such as the one described in process 100. FIG. 2 illustrates a bitcoin hostname "Cointag.io/akbar" generated for a user with name "akbar" by mapping his bitcoin address "1MsL7caYw1r65mhcTAufNbTwRy2N1bxxBG) and the name to the bitcoin hostname.

Sending Bitcoin Through Social Media

Figure 3:
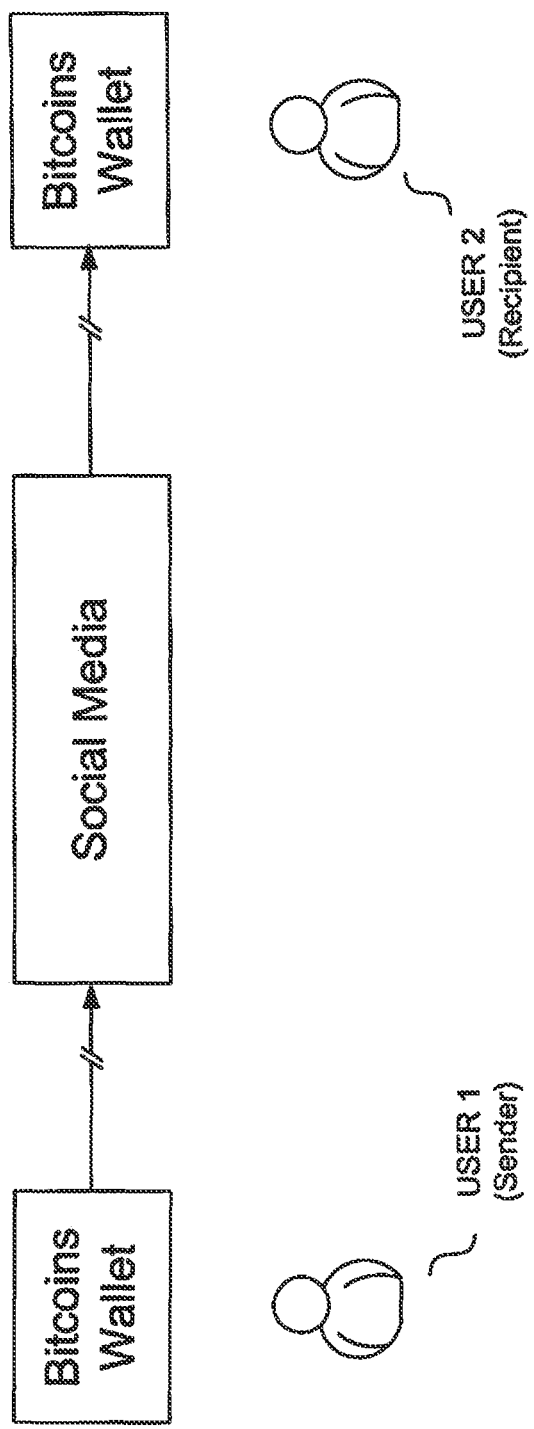
FIG. 3 is block diagram of a system for sending bitcoins using communication networks, such as a social network.

FIG. 3 is a flow diagram of a process for sending bitcoin over communication networks, such as social network. The social network can include Twitter, Facebook, email, Reddit, WhatsApp., etc. Other communication networks can include email, telephone (e.g., via short message service (SMS) or app installed on a smartphone), etc. A user can register with a bitcoin service provider, such as the bitcoin DNS service, and use the service provider to send and/or receive bitcoins using bitcoin hostnames of the users. Further, the users may link their bitcoin hostnames or address with their user accounts of social networks, such as Twitter, to send and/or receive bitcoins using their user identifications (IDs) of their social network user accounts. For example, a user "A" may send bitcoins to user "B" in Twitter by tweeting bitcoins to the Twitter user ID of user B. The bitcoin service provider would the resolve the mapping of the bitcoin hostnames/Twitter IDs to the bitcoin address of the sender and the recipient and facilitate the exchange of bitcoins accordingly.

Figure 4:
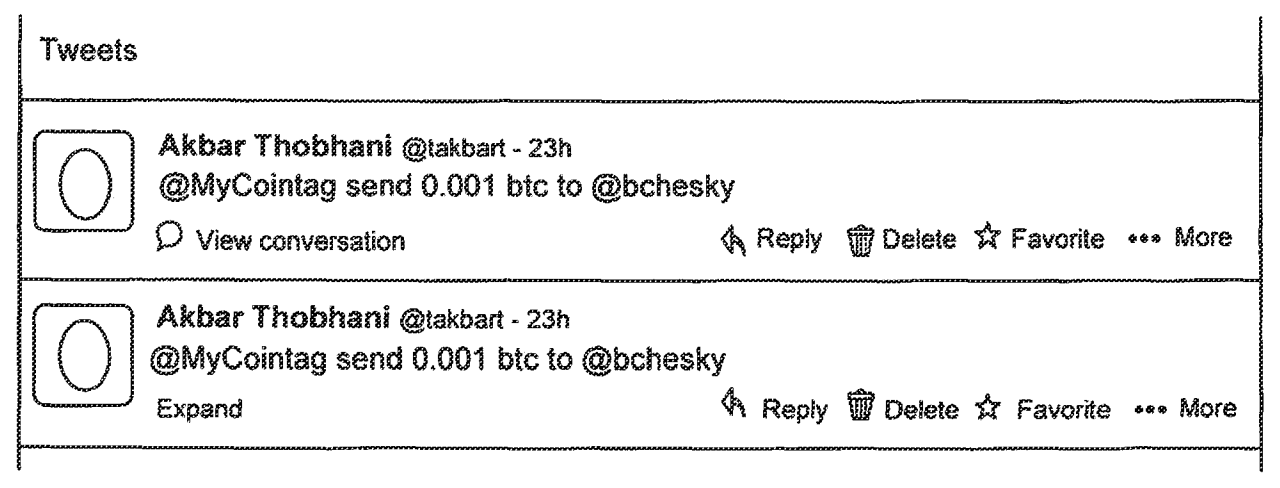

FIG. 4 is an example of a GUI illustrating sending a bitcoin or a portion thereof via a tweet in Twitter. The user "Akbar Thobhani" can send a bitcoins or portion thereof to another user by tweeting the bitcoin to the other user. As illustrated in FIG. 4, the user "Akbar Thobhani" is tweeting from his twitter account "@takbart" to the recipients Twitter account "@bchesky" using the bitcoin service provider"@MyCointag."

To perform transactions, e.g., send and/or receive bitcoins, using the social network user account and the bitcoin service provider, the user can link his social network user account with the bitcoin service provider so that the bitcoin service provider can identify the user when a user issues a request from the social network application. The linking can be performed in various ways. For example, the user can specify his social network user account to the bitcoin service provider, e.g., in the user profile of the user with the bitcoin service provider. The bitcoin service provider can then send a verification code to the user, e.g., as a text on the user's phone, a tweet to the users Twitter account, etc., for authenticating the user account.

Figure 5:
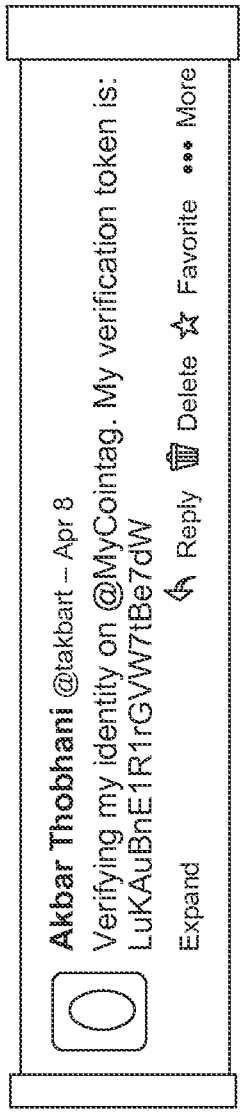
FIG. 5 is an example of a GUI illustrating an authentication process for authenticating a user using a social network such as Twitter.

The user may confirm his authenticity by providing the verification code to the bitcoin service provider. For example, to link a Twitter ID of the user to the user account at the bitcoin service provider, the user may send the verification code, which the user received from the bitcoin service provider as described above, by tweeting the verification code to the bitcoin service provider. Upon receiving the verification code, the bitcoin service provider links the user's Twitter user ID to the user's bitcoin service provider account, which includes the user's bitcoin hostname and/or address. In some embodiments, the bitcoin service provider uses the verification mechanism to verify and/or authenticate the sender whenever the sender initiates a transfer request. FIG. 5 is an example of a GUI illustrating an authentication process for authenticating a user using a social network such as Twitter.

The user can send bitcoins to the recipient using the bitcoin service provider in various ways. For example, the user can send bitcoins by tweeting to a recipient, sending bitcoins in a subject line in an email, SMS, or other forms; send directly to the recipient but copy the bitcoin service provider.

If the recipient already has a bitcoin hostname maintained/provided by the bitcoin service provider and has been verified with the social network user account, then the funds are directly credited to the recipient, e.g., his digital wallet corresponding to the bitcoin hostname and/or address. In some embodiments, if the recipient is not an existing user of the bitcoin service provider, then the recipient will be asked to create a new account with the bitcoin service provider, authenticate their social network account (e.g., using verification mechanism as described above) and funds are then credited to the recipient's account. In some embodiments, if the recipient is an existing user but has not connected the social network account with the bitcoin service provider (e.g. they have a cointag account but did not register their Twitter account with cointag), then the recipient is asked to link his social network account with bitcoin service provider account and the bitcoin service provider will transfer the bitcoins to recipient's wallet.

Figure 6:
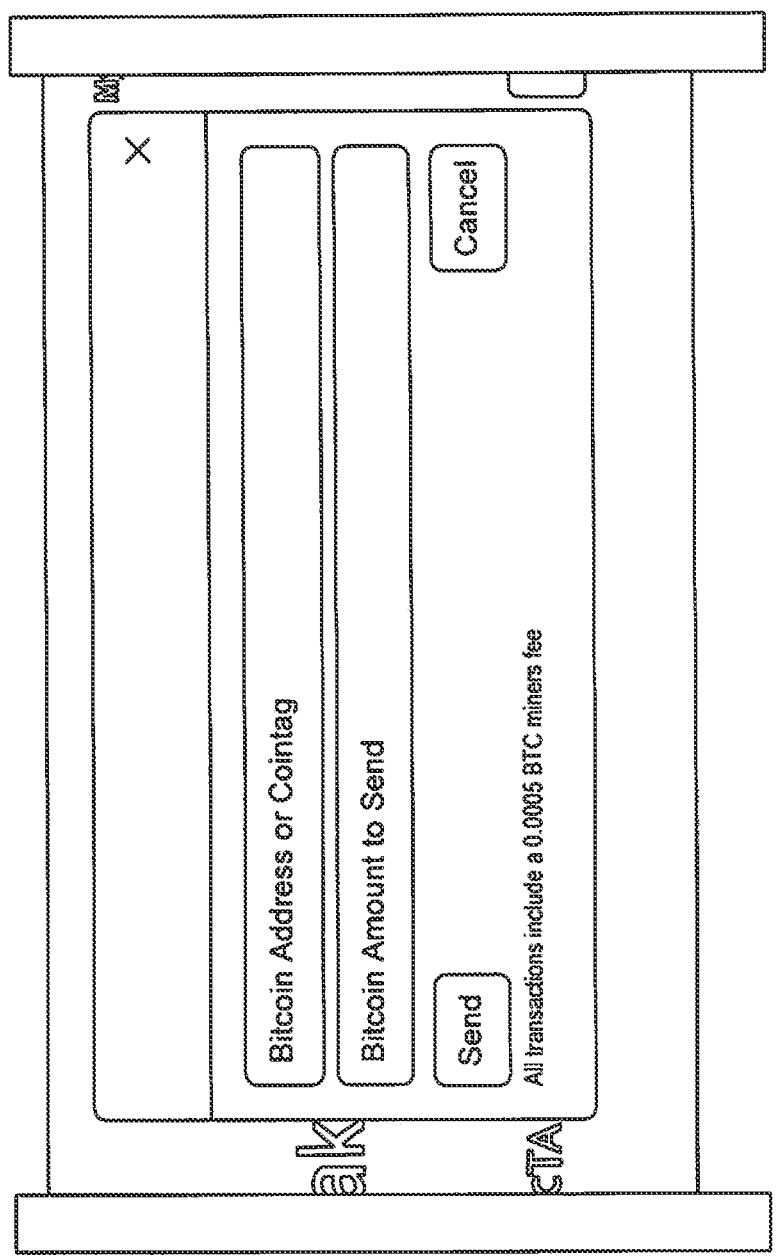
FIG. 6 is an example of a GUI for sending bitcoins using a transfer service provided by a bitcoin service provider.

FIG. 6 is an example of a GUI for sending bitcoins using a transfer service provided by a bitcoin service provider. In FIG. 6, the user may send bitcoins to a recipient using the bitcoin address of the recipient or the bitcoin hostname of the user, such as "Cointag.io/akbar," which is generated by the bitcoin service provider "Cointag.io."

Bitcoin Trading Platform

Figure 7:
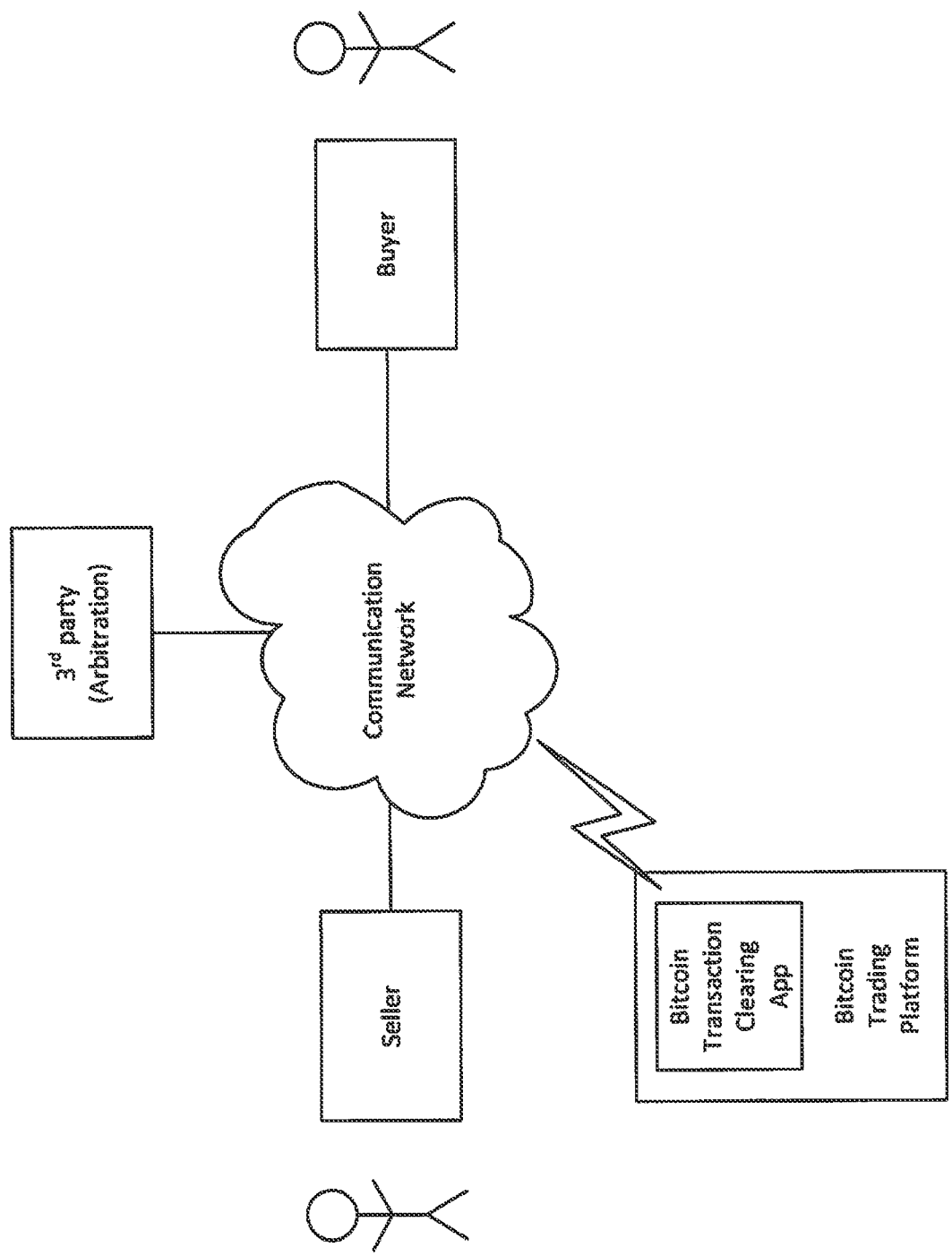
FIG. 7 is a block diagram of an environment in which a bitcoin trading platform can be implemented.

FIG. 7 is a block diagram of an environment in which a bitcoin trading platform can be implemented. The environment includes a seller and a buyer (also referred to as "customer" or "consumer"). The third party can be, for example, an arbitrator. An arbitrator is an entity that monitors a transaction between the seller and the buyer. In some embodiments, a transaction may not be completed without an approval from the arbitrator. The environment also includes the Bitcoin Trading Platform having a bitcoin transaction clearing application that acts as a clearing house to clear a bitcoin transaction by sending the bitcoin from the seller to the buyer, according to various embodiments. Each of the aforementioned computer systems can include one or more distinct physical computers and/or other processing devices which, in the case of multiple devices, can be connected to each other through one or more wired and/or wireless networks. All of the aforementioned devices are coupled to each other through a network, which can be or include the Internet and one or more wireless networks (e.g., a WiFi network and or a cellular telecommunications network).

In some embodiments, the trading platform would have smarts of identifying open orders from various exchanges (or its own market), offering it to customer, allowing the customer to purchase/sell/exchange bitcoins and clear the transaction. In some embodiments, algorithms can be provided to make transactions easier, such as limit orders, orders triggered on certain conditions, distributing trade across multiple exchanges, trading on various times, arbitrage across multiple exchanges; and once orders satisfy requirements, trades are undertaken. The bitcoin transaction can be cleared in various ways. For example, clearing crypto-currency (e.g., bitcoins) transaction process can be done by a platform holding the crypto currency and transferring once the other side of transaction is fulfilled. In some embodiments, clearing process can be completed using "multi signatures," where the seller of the crypto-currency and the platform both have to sign before the crypto-currency can be transferred to buyer.

The multi signature can serve many purposes. For example, it can minimize the risk of an entity involved in the transaction becoming a victim of fraud. Having the seller sign the transaction before the trading platform can conclude the transaction, the seller can be assured that his/her currency would not be misused by the platform. Similarly, having the platform sign the transaction before the seller can conclude the transaction, the platform can be assured that the seller won't double spend the currency. Once the transaction concludes, the seller can release his/her signature in return for settlement of the trade (e.g., cash). In some embodiments, if multi-signatures are used, one way to minimize risk is by having the third party (arbitration) sign the transaction. If the two parties don't agree, the third party can decide whether to release the bitcoin or not. That is, only two of the three signatures would be required to transfer (e.g., seller and platform, seller and third party, or platform and third party).

Security Regarding Bitcoin Storage

Figure 8:
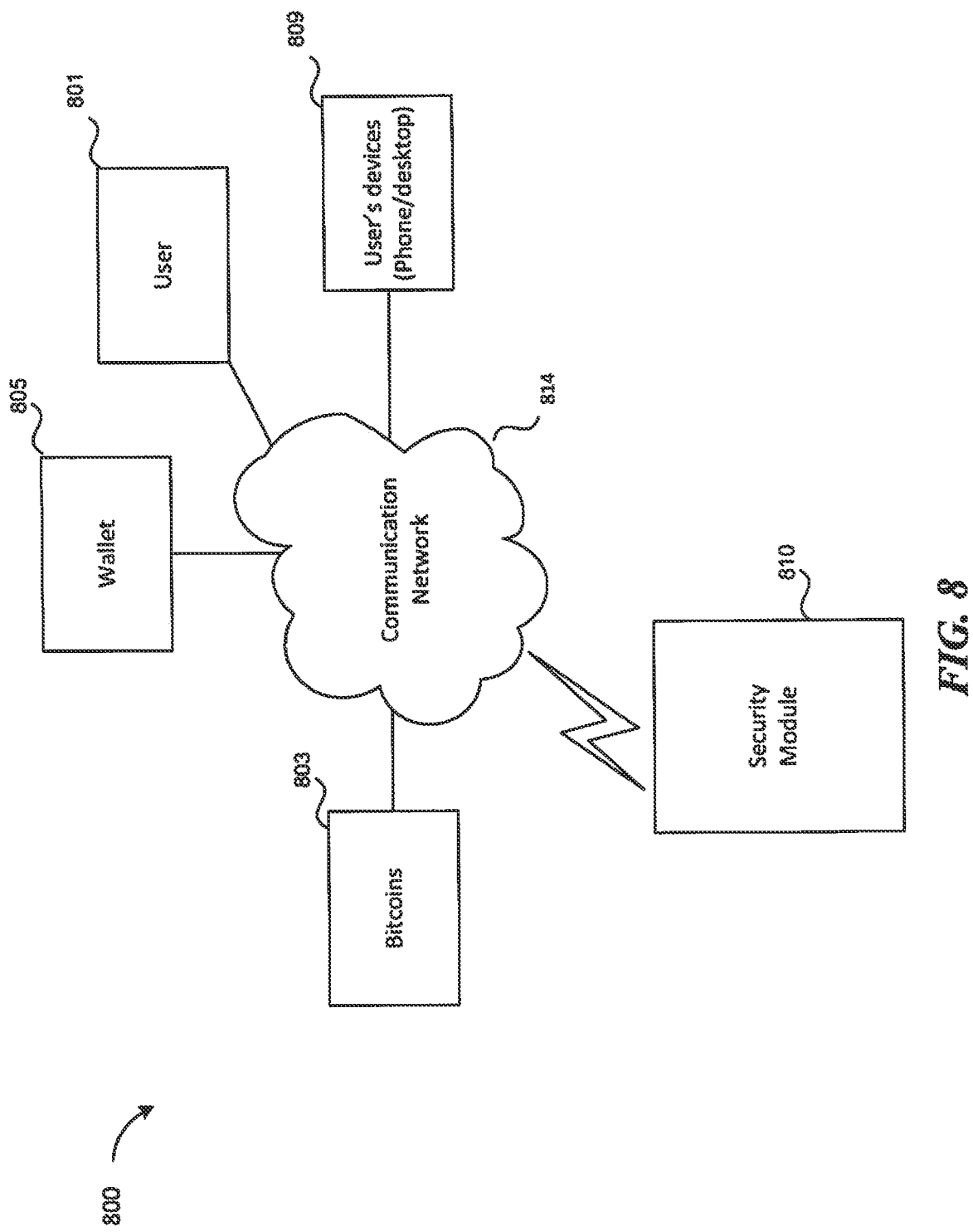
FIG. 8 is a block diagram of an environment in which secure bitcoin storage services can be implemented.

FIG. 8 is a block diagram of an environment in which secure bitcoin storage services can be implemented. The environment includes a user 801, user's bitcoins 803, a bitcoin service provider such as a wallet 805, a user's device(s) 809, and a security module 810. The user device(s) 809 can be, for example, a smart phone, tablet computer, notebook computer, or any other form of mobile processing device. Each of the aforementioned computer systems can include one or more distinct physical computers and/or other processing devices which, in the case of multiple devices, can be connected to each other through one or more wired and/or wireless networks.

Bitcoins can be stored securely in a number of ways. In some embodiments, bitcoins can be stored securely using multiple signatures, where multiple entities are required to approve, e.g., sign, in order to access the bitcoins. For example, to access bitcoins of a user 801, the user 801 and the wallet 805 may have to sign together. In another, user's two different devices (smartphone/desktop) may have to approve before the user 801 can access the bitcoins 803.

In some embodiments, bitcoin can be stored securely by storing the bitcoins using a security module 810, such as crypto-cards. In this solution, the bitcoin's private key is encrypted by the key in the security module 810. The security module 810 can be designed to be tamper proof so that the key cannot be stolen. For example, the security module 810 can be designed to self-destroy if a tampering is detected by the security module 810. In an organization setup having a number of employees, the security module 810 can be configured to provide access to the bitcoins based on an approval by multiple employees to prevent employees from individually accessing the private key. The security module 810 can also be configured to perform a bitcoin transaction. In some embodiments, the security module 810 can be connected to a communication network 814, which can be or include the Internet and one or more wireless networks (e.g., a WiFi network and or a cellular telecommunications network).

Figure 9:
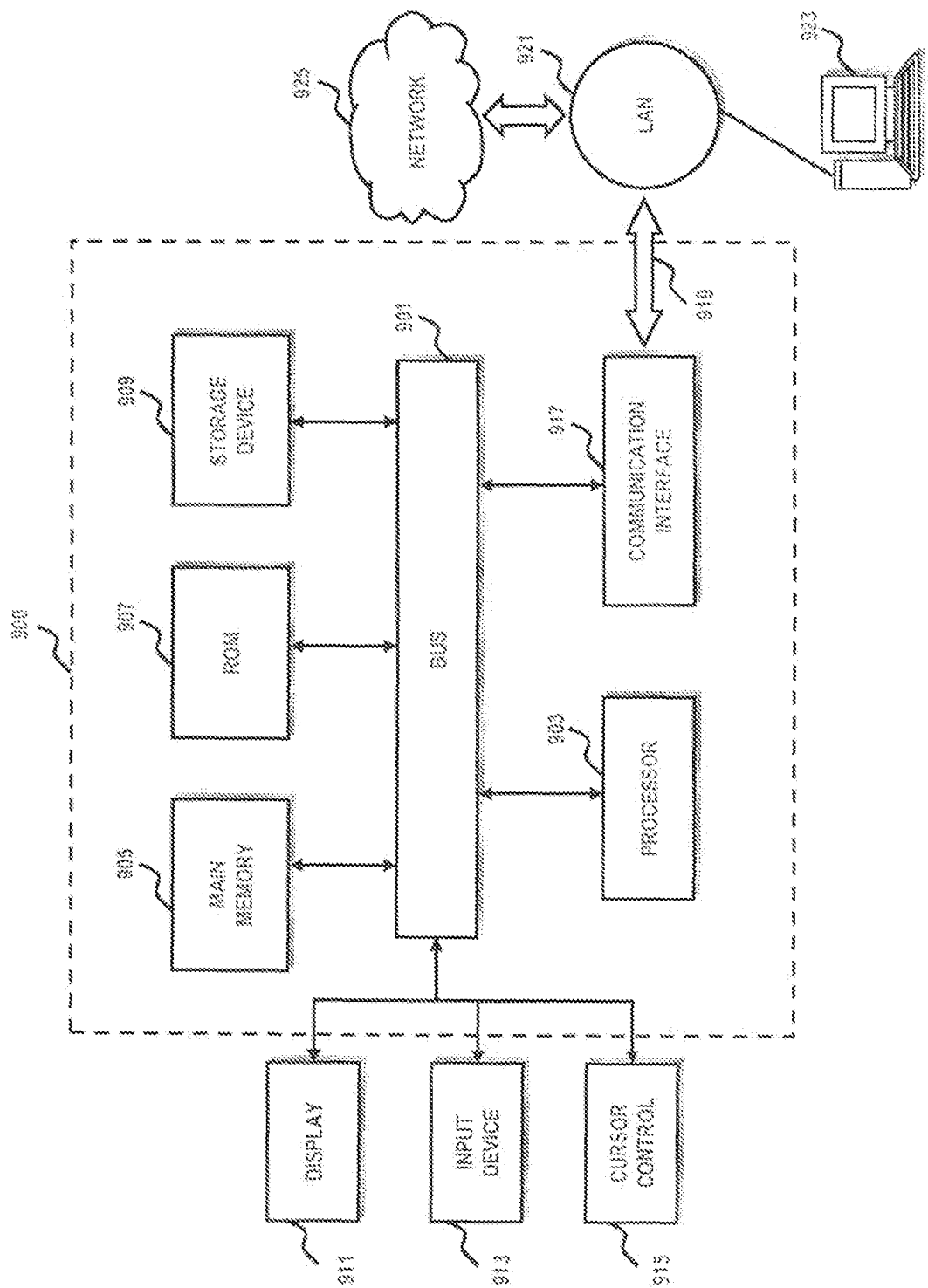
FIG. 9 is a block diagram of a computer system as may be used to implement various embodiments described herein.

FIG. 9 is a block diagram of a computer system that can be used to implement various embodiments described herein. The computer system 900 may be used to implement any of the entities, components or services depicted in the examples of FIGS. 1-8 (and any other components described in this specification). The computer system 900 includes a bus 901 or other communication mechanism for communicating information and one or more processors (of which one is shown) 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for adjusting cursor movement on the display 911.

According to an embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment. Thus, embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of such phrases in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Disclosed are various embodiments to provide secure storage of cryptocurrency. Some embodiments disclose a method for restricting cryptocurrency transfer out of a digital wallet, which can be obtained prior to embodiments of the invention or in conjunction therewith. The digital wallet contains cryptocurrency and has one or more owners or users associated therewith.

Figure 10:
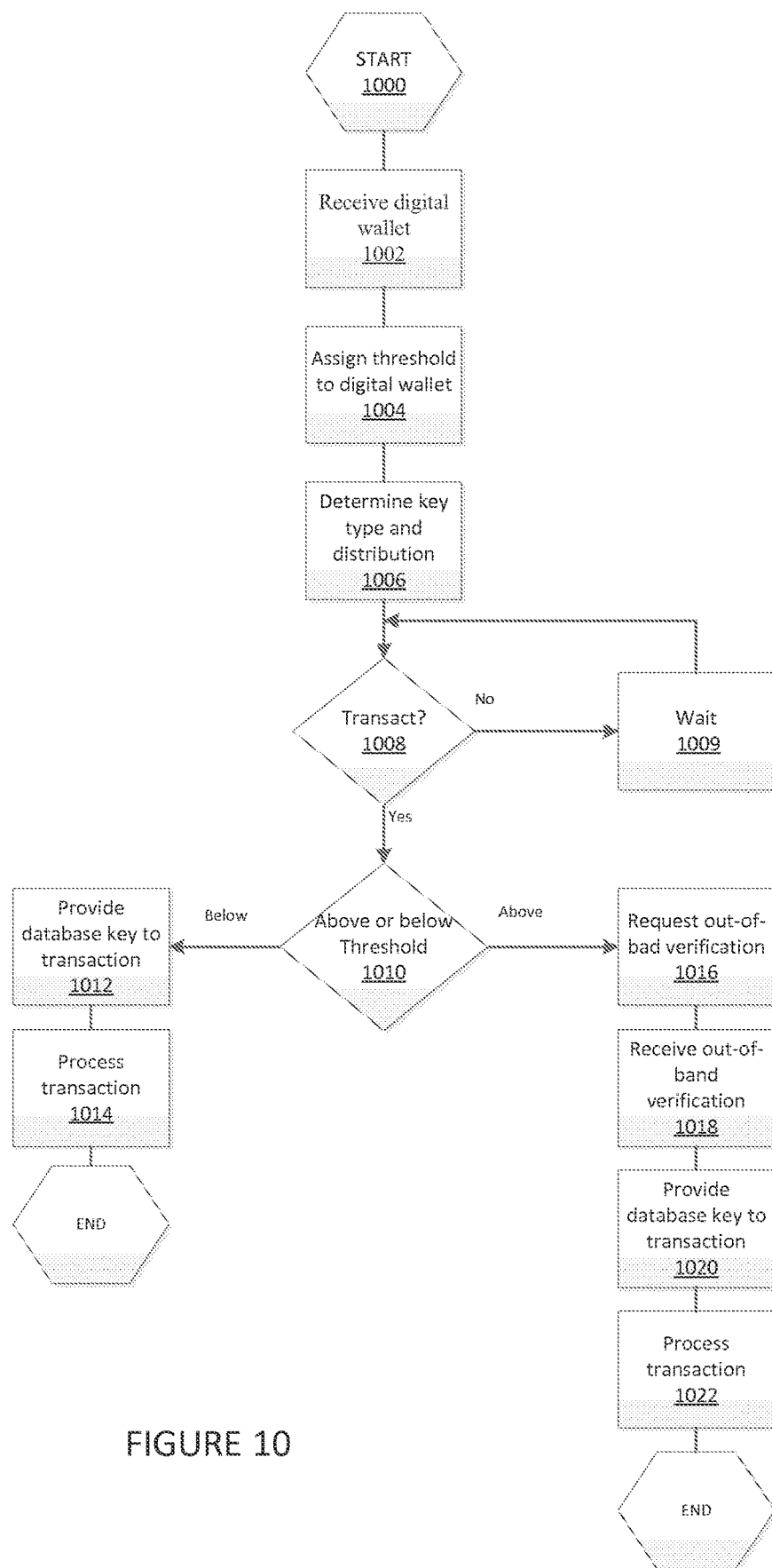
FIG. 10 is a flow chart of an embodiment of the method of providing bank service security to cryptocurrency, according to various embodiments.

FIG. 10 is a flow chart of an embodiment of the method of providing bank service security to cryptocurrency, according to various embodiments. In some embodiments a security database is used. In step 1002, the security database either engages in purchasing the digital wallet or the digital wallet is presented to the security database for keeping. Cryptocurrency digital wallets are maintained on a distributed public ledger system, thus "presenting" a digital wallet, which in this case refers to the digital wallet providing the security database with at least one private key associated with the digital wallet.

In step 1004, either a user, an automated process, or a programmed algorithm establishes within the security database a threshold that is associated with transfer of cryptocurrency out of the digital wallet. The threshold is a predefined amount of cryptocurrency chosen by a user, an automated process, an algorithm, an amount that is a percentage of the balance of the digital wallet, or any other suitable way known in the art to select a wallet threshold. The only numerical requirement on the threshold is that the threshold be greater than zero.

The threshold amount does not necessarily have to be defined in a cryptocurrency amount. Rather, the threshold is provided in other currencies, such as national currencies like the US dollar. As a result, exchange rates between cryptocurrencies and national currencies vary. In some cases, the actual amount of the threshold varies from day to day. Illustrative examples for threshold amounts include $100, 5BTC, or a "dust amount" (a minimum transfer amount for cryptocurrency transactions).

In step 1006, either the security database itself or the digital wallet requires at least two verification signatures for all amounts of cryptocurrency transferred out of the digital wallet. The at least two verification signatures comprise a first key and a second key. In some embodiments, the security database accepts a single private key for the digital wallet and in turn produces arbitrary keys that are disconnected from the digital wallet. The arbitrary keys are generated by the security database and are subsequently associated with the digital wallet through database records. The security database distributes the arbitrary keys in a plurality of ways, but requires both of the arbitrary keys to be verified before issuing the use of the single private key for the digital wallet. The security database is protected by web and computer security measures known in the art and, thus, storage of the private key on the security database is relatively secure.

The security database may also generate keys which combine by mathematical algorithm to create the private key. This is a form of arbitrary key which is not disconnected from the digital wallet. Rather, a party with both keys and the algorithm to combine these keys is enabled to derive the private key associated with the digital wallet.

In some embodiments, if the keys are not provided in a predefined time period of one another, additional issues result. In some cases, the resulting issues are as minor as cancelling the transaction. In other cases, the security database requires the user to verify the user's identity again. In still other cases, the account is considered compromised and one or more of the keys is retired.

In some embodiments, the digital wallet is a multi-signature wallet. Thus, in order to complete transactions with the digital wallet, two or more wallet keys are required before the distributed network that manages the digital wallet processes any transaction. In this embodiment, the security database holds one or more of these wallet keys. When more than one wallet key is held by the security database, each wallet key is held separately; thus, if a malicious actor obtains a first wallet key from the security database, the malicious actor is still prevented from transferring cryptocurrency out of the digital wallet. As an alternative in this embodiment, the user or owner of the digital wallet holds a wallet key, and the security database holds a wallet key as well.

As an alternative to a multi-signature wallet, a single wallet key is divided. Wallet keys comprise a string of characters. In some embodiments, those characters are split wherein part of the string is held by a first party, and a second part of the string is held by a second party.

Some embodiments include a hybrid system of wallet keys and arbitrary keys. In a hybrid system, the digital wallet is configured to require multiple signatures. For example, the user or owner holds one wallet key and the security database holds the other wallet key. In addition, the security database additionally distributes one or more arbitrary keys. In this embodiment, the arbitrary keys are required for the security database to issue the use of the wallet key that was given to the security database. However, a variety of combinations in distributing and using arbitrary keys is possible.

Regardless of the kind of key used, various embodiments involve distributing the first key to a user and the second key to the security database. This dual distribution ensures that without both the user and the security database, cryptocurrency cannot transfer out of the digital wallet. In step 1008, the user decides whether to transact. If the user chooses not to transact at that time, at step 1009 the security database waits until the user chooses to transact. However, if the user chooses to transact at that time, in step 1010 the security database determines if the user transaction is above or below the threshold.

In step 1012, when the user submits a low request comprising requesting the security database to enable a transaction out of the digital wallet in an amount below the threshold and providing the first key to the security database, then the database provides the second key to the transaction. In some embodiments, the security database provides the second key without any additional verification because these transactions are deemed too small for enhanced security measures. In step 1014, the transaction is processed and appears on a public ledger.

Alternatively, when a number of transactions below the threshold occur in quick succession and add up to the threshold, additional measures are taken. Such measures include treating the series of smaller transactions as a single transaction over the threshold.

At step 1010, when the security database determines that the user's request to enable a transaction out of the digital wallet is an amount above the threshold, and if the user has provided the first key to the security database, then additional security measures are required. In step 1016, the security database requests that the user provide the security database with an out-of-band verification. In step 1018, the security database receives the requested out-of-band verification.

This out-of-band verification is conducted on a different platform than the platform on which the user provided the first key to the security database. Out-of-band verification takes many forms. Illustrative embodiments of out-of-band verification include a phone call, an email with an affirmation link or code, a phone application that generates security tokens or codes, a phone application communicatively coupled to the security database, a text message, an affirmation device, or any other out-of-band verification known in the art.

In step 1020, after the security database has verified the presence of the first key and received the out-of-band verification, then the security database provides the second key, thus submitting the proposed transaction to a cryptocurrency exchange to cause a transfer out of the digital wallet. In step 1022, the transaction is processed and the transaction appears on a public ledger.

In some embodiments, the cryptocurrency exchange is a computer application that communicates the transaction request to the distributed public ledger. In some embodiments, the security database further comprises a cryptocurrency exchange application and provides the disclosed security features and cryptocurrency transfer service all on a single interface. In some embodiments, the cryptocurrency involved is Bitcoins. Accordingly, the public ledger involved is the Blockchain and the transactions are processed via miners.

Figure 11:
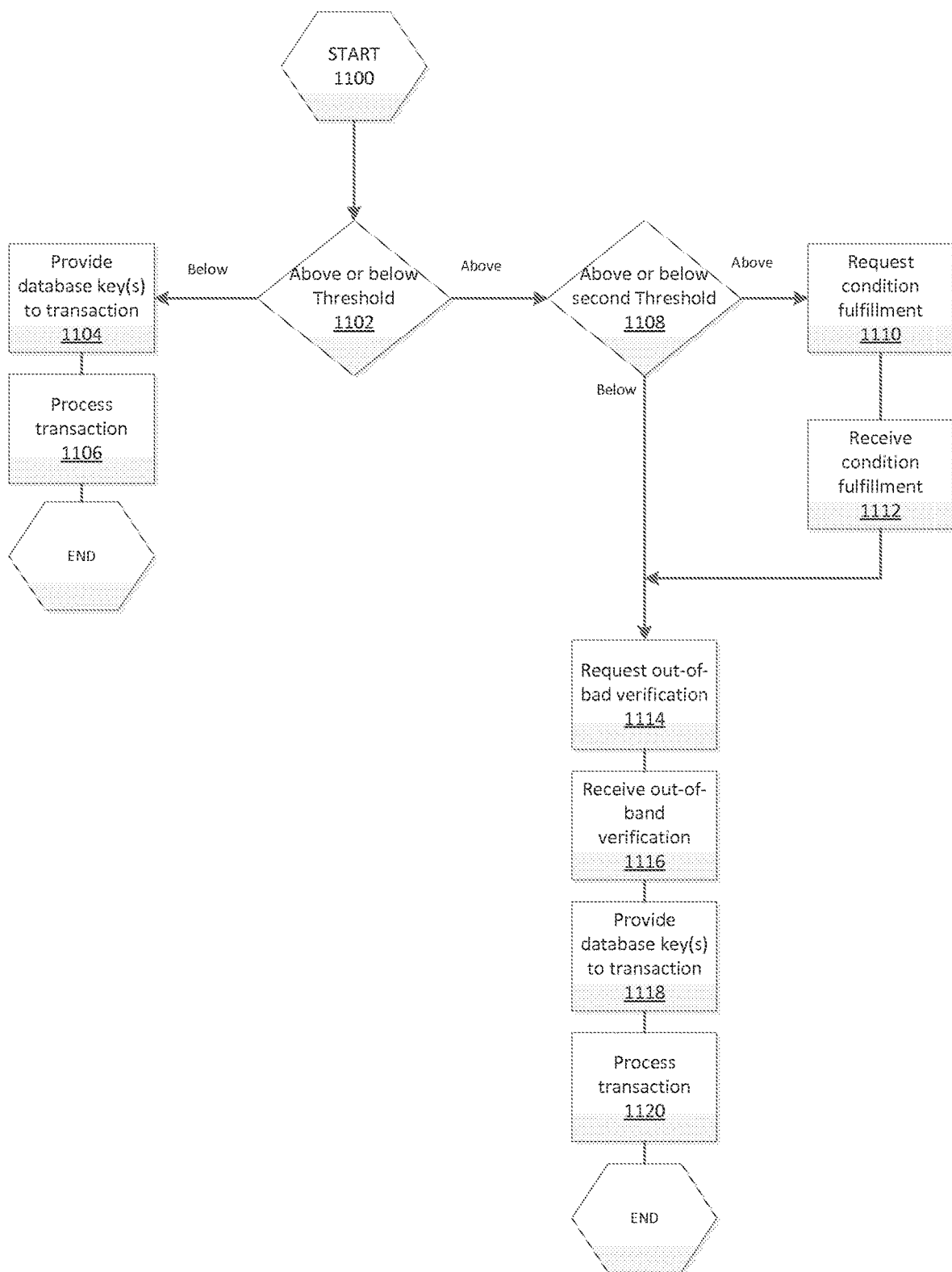
FIG. 11 is a flow chart of an alternate embodiment of the method of providing bank service security to cryptocurrency, according to various embodiments.

FIG. 11 is a flow chart of an alternate embodiment of the method of providing bank service security to cryptocurrency, according to various embodiments. Some embodiments include more verification signatures. For example, three verification signatures are required for all amounts of cryptocurrency transferred out of the digital wallet. The at least three verification signatures comprise the first key, the second key, and a third key. Additionally, the inclusion of the additional keys involves establishing a high threshold. The high threshold is a predefined amount of cryptocurrency above the threshold. Essentially, the inclusion of additional keys enables the ability to establish additional thresholds.

When there are three or more keys involved, there are additional options for key splitting. Where two keys together run through an algorithm provide the private key associated with the digital wallet, three keys provide the opportunity to generate a new code through the algorithm. In this way the security database is enabled to determine whether or not 2 or 3 keys are present based upon the computed code. In transactions where only 2 keys are relevant to the processing of the transaction the code based on computing the combination the first two keys is sufficient. In other transactions, the code based on computing the combination of all keys is required.

If a transaction request is determined in step 1102 to be above the base threshold, then in step 1108, the security database determines whether the transaction request is above or below the second, high threshold. If the request is above the second threshold, the user submits a high threshold request to the security database to enable a transaction of cryptocurrency out of the digital wallet in an amount above the high threshold. In step 1110, the security database then requests that the user satisfy a condition. In step 1112, the condition is satisfied. In step 1118, the security database provides the third key to the high threshold transaction.

These embodiments enable additional thresholds and more complex security measures. An illustrative example of a condition includes requiring that the high threshold transaction occur during business hours so that a human reviewer is able to review the transaction before processing said transaction. More examples include requiring a second out-of-band verification, requiring a second user or "bank employee" to verify the authenticity of the identity of the first user or owner.

Additional security measures include tamper protection. For example, in some embodiments, a user attempting to retrieve the second key without also providing the first key triggers the security database to delete, destroy, hide, obscure, or encrypt the second key.

Figure 12:
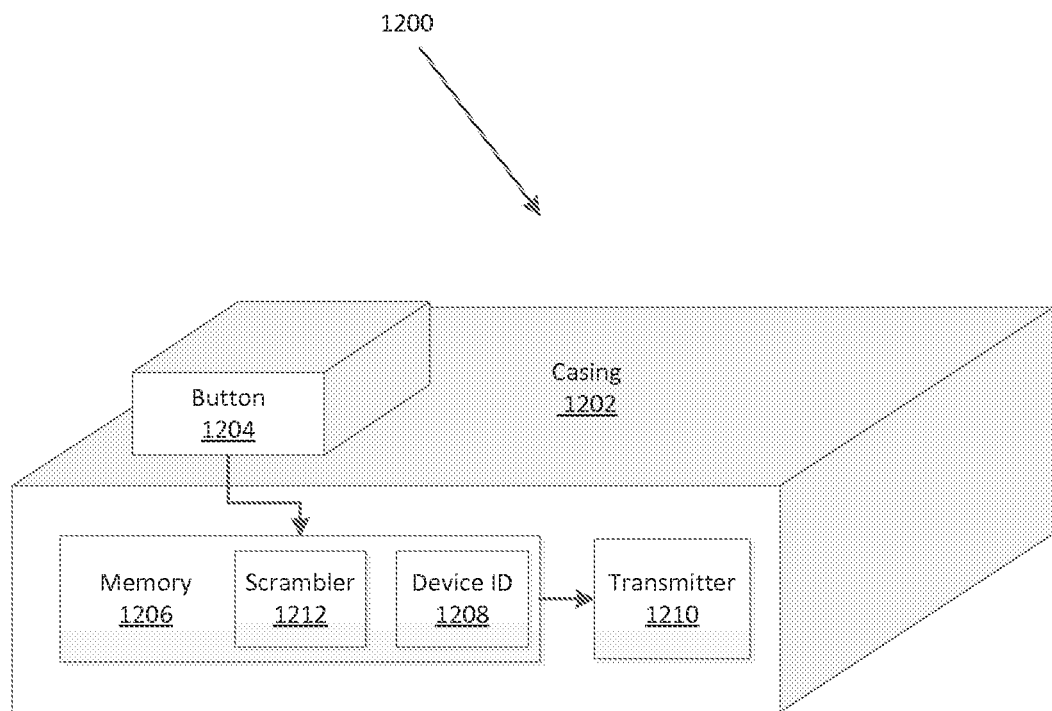
FIG. 12 is a block diagram of an out-of-band concealable security device 1200, according to various embodiments.

FIG. 12 is a block diagram of an out-of-band concealable security device 1200, according to various embodiments. In some embodiments, the out-of-band verification occurs by use of a concealable device 1200. The device includes a casing 1202, preferably something inconspicuous and small. In some embodiments, the casing 1202 is configured to be attached under a desk, inside a drawer, out of direct vision, or in a hidden compartment. On the casing 1202 is a button or switch 1204. Inside the casing is a memory 1206 storing a device ID 1208. Additionally included is a transmitter 1210. The transmitter 1210 is communicatively coupled with the memory 1206 and the security database 810 of FIG. 8. The transmitter 1210 connects to the security database 810 by any suitable means known in the art. Such means include hardwire to a local Internet connection, Wi-Fi, VPN, cellular data network, and cellular telephone network.

When a user makes a transaction request where an out-of-band verification is required before the security database 810 releases one or more keys, the user actuates the button or switch 1204 and the transmitter 1210 delivers the device ID 1208 to the security database 810. The device ID 1208 in turn informs the security database 810 that the user owning the concealable device 1200 and associated with the digital wallet has satisfied an out-of-band verification.

In some embodiments, the concealable device 1200 additionally includes a scrambler 1212. The scrambler 1212 is a software tamper-protection program. The scrambler 1212 is designed to delete the device ID 1208 when there is any attempt to retrieve the device ID 1208 by a means other than by actuating the button or switch 1204 to transmit the device ID 1208 to the security database 810.

The following is an illustrative example of some of the embodiments in action in reference to FIGS. 10, 11 and 12. Imagine an owner of a healthy, multi-signature digital wallet of Bitcoin who has provided one of the public-private key pairs to the security database ("banking service"). The banking service additionally comprises a Bitcoin exchange application by which blockchain miners are notified of transactions.

The user decides to send $5 to a friend. The user contacts the security database's exchange application with an amount in Bitcoin that presently corresponds to $5, provides the friend's public key address as an output, and additionally provides the user's public-private key as an input. The bank service notices that this is a low amount, below the threshold, which, for the sake of illustration, is $50. As a result of the low amount, the bank service immediately applies the public-private key pair that the bank keeps for the user's digital wallet. Since both signatures are present, the transaction processes properly and the friend receives $5 worth of Bitcoin.

In another situation, the user decides to buy a $1,000 TV. The user contacts the bank service's exchange application with an amount in Bitcoin that presently corresponds to $1000, provides the TV merchant's public key address as an output, and additionally provides the user's public-private key as an input. The user additionally reaches under the user's desk and presses the button on the concealable device, thereby transmitting the device ID to the bank service. The bank service verifies that the amount is above the threshold associated with the user's digital wallet; however, the bank service also notices that the device ID associated with this digital wallet has been provided along with the user's public-private key pair. The bank service then applies the public-private key pair that the bank keeps for the user's digital wallet. The transaction processes and the user successfully orders the TV.

In another situation, the user decides to buy $10,000 worth of stock. This amount is over a second high threshold. For illustrative purposes, the second threshold is $2,500. The user contacts the bank service's exchange application with an amount in Bitcoin that presently corresponds to $10,000, provides the stock broker's public key address as an output, and additionally provides the users public-private key as an input. The user once again presses the button on the concealable device under the user's desk. The bank service receives the device ID, the user's public-private key, and notices the amount of $10,000. Because this amount is over the high threshold, the bank service additionally places a call to the user's phone number on file and asks the user to identify himself or herself and affirm that the user actually intends to transfer that much Bitcoin to the stock broker. The user does this. The bank service is satisfied and applies the public-private key pair that the bank keeps for the user's digital wallet. The transaction processes and the user successfully purchases the stock.

Figure 13:
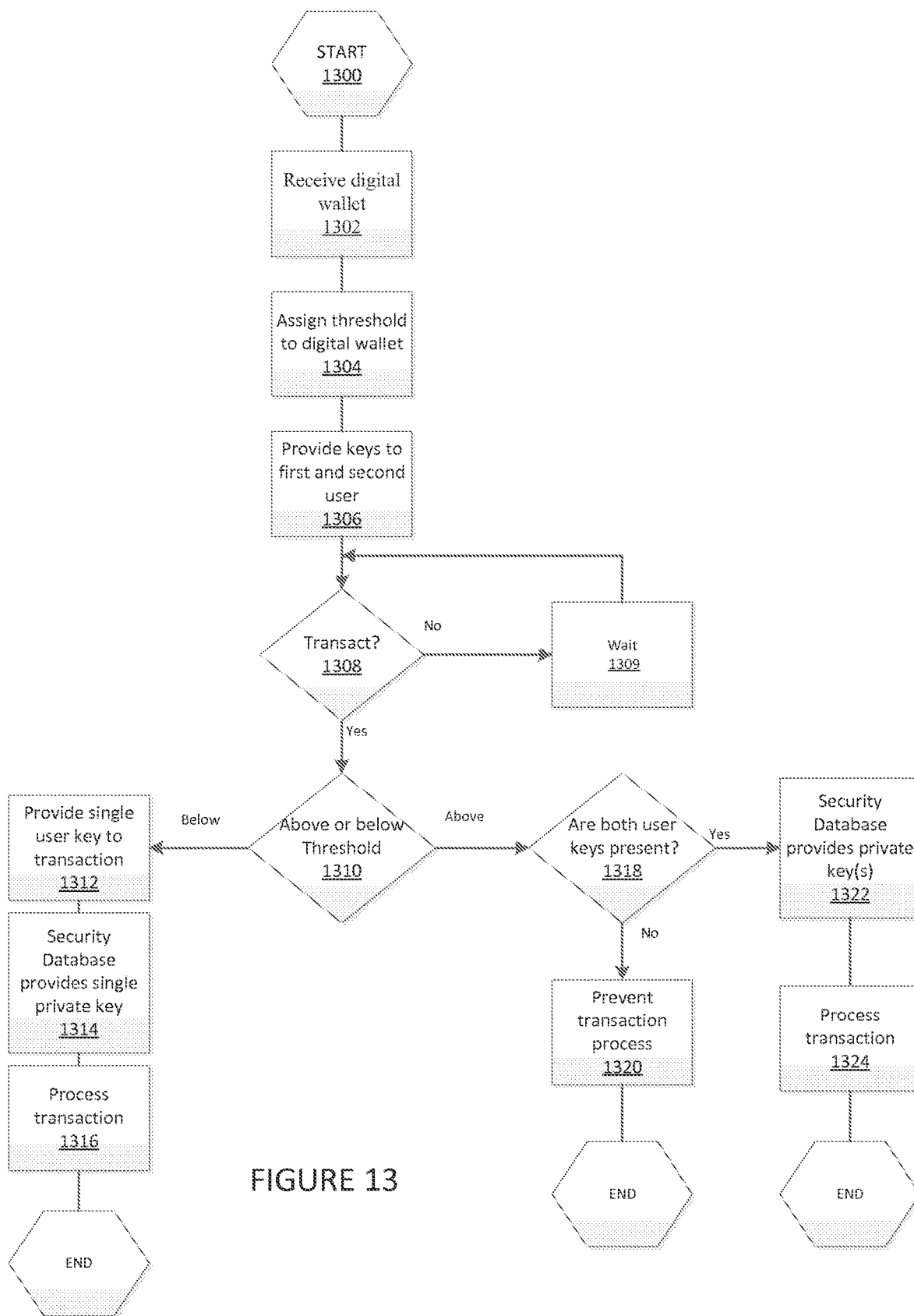
FIG. 13 is a flow chart of an alternate embodiment of a method to provide security to cryptocurrency, according to various embodiments.

FIG. 13 is a flow chart of an alternate embodiment of a method to provide security to cryptocurrency, according to various embodiments. An alternate embodiment of the invention discloses a modified distribution of keys. Many of the steps are the same as displayed in FIG. 10. In step 1306, instead of providing a key each to a user and the security database, the keys are provided to a first user and a second user. In some cases, the digital wallet is programmed such that the threshold is built into the digital wallet. In other cases, the keys belonging to the first and second users are both arbitrary keys and the security database holds the real public-private key pair. The first and second users act as checks upon one another such that each is able to spend up to the threshold by themselves, but spending over the threshold requires both of the users.

In step 1312, in a low transaction, a single user provides his or her key to a transaction. Either users key is sufficient.

The security database verifies that one key is present and that the transaction is below the threshold. In step 1314, the security database provides the public-private key to the transaction. In step 1316, the transaction processes to the public ledger.

In step 1318, when the requested transaction is above the threshold, the security database requires both users' keys to process the transaction. In step 1320, if one or both of the keys are not present, the transaction is prevented. Various embodiments and means for preventing a transaction are disclosed above in other examples. In step 1322, when both user keys are available, the security database provides the necessary public-private keys (in the case where the users have arbitrary keys). In the case where the users each have a public-private key pair, the security database provides the exchange application. In step 1324, the transaction is enabled to process.

In some embodiments, the first user and the second user provide their respective keys to the security database. In some embodiments, the first user and the second user provide their respective keys to an external exchange application.

In an illustrative transaction, the first and second user are both employees at the same company. In order to protect company funds, keys from both the first and second user are required to sign transactions over a certain amount.

What is claimed is:

1. A method for restricting cryptocurrency transfer out of a digital wallet, comprising:
    establishing, by a security database, a threshold associated with transfer of cryptocurrency out of the digital wallet, the threshold being an amount of cryptocurrency;
    storing, by the security database, a private key of the digital wallet, the private key required for all amounts of cryptocurrency transferred out of the digital wallet;
    requiring, by the security database, at least two verification signatures to access the security database, the at least two verification signatures comprising a first key and a second key, where the first key and second key are generated by the security database and associated with the digital wallet through security database records;
    providing the first key to a first user and the second key to a second user;
    acting, by the security database, as an intermediary between the first user and second user and the digital wallet;
    receiving a threshold request from the first or second user requesting the security database to enable a threshold transaction of cryptocurrency out of the digital wallet in an amount above the threshold and receiving the first key and the second key at the security database, then verifying by the security database the first key and the second key;
    authorizing, by the security database, via use of the private key, a transfer out of the digital wallet.

2. The method of claim 1, wherein the threshold is converted into a national currency.

3. The method of claim 1, wherein the cryptocurrency is Bitcoin.

4. The method of claim 1, further comprising:
    verifying by the security database the first key and second key, by requesting the first user or second user provide the security database with an out-of-band verification to verify the corresponding key.

5. The method of claim 4, wherein the out-of-band verification occurs by receiving a button press within a predefined period of time of the threshold request on a concealable device.

6. The method of claim 5, wherein the concealable device comprises a security module, a housing, a button, and a transmitter.

7. The method of claim 4, wherein the out-of-band verification is a phone call.

8. The method of claim 4, wherein the out-of-band verification is an email.

9. The method of claim 4, wherein the out-of-band verification is a security code.

10. The method of claim 4, wherein the out-of-band verification occurs by an approval via a smartphone application communicatively connected to the security database.

11. The method of claim 1, further comprising:
    after the security database verifies the first key and second key, requesting, by the security database, that the first or second user provide the security database with an out-of-band verification.

12. The method of claim 11, wherein the out-of-band verification occurs by receiving a button press within a predefined period of time of the threshold request on a concealable device.

13. The method of claim 12, wherein the concealable device comprises a security module, a housing, a button, and a transmitter.

14. The method of claim 11, wherein the out-of-band verification is a phone call.

15. The method of claim 11, wherein the out-of-band verification is an email.

16. The method of claim 11, wherein the out-of-band verification is a security code.

17. The method of claim 11, wherein the out-of-band verification occurs by an approval via a smartphone application communicatively connected to the security database.

18. The method of claim 1, further comprising:
    detecting an unauthorized access to the security database without additionally receiving the first key, and then deleting, by the security database, the private key.

19. The method of claim 1, further comprising:
    when a series of low transactions is requested within a predefined period of time, then transforming the requests for the series of low transactions into said threshold transaction.

20. The method of claim 1, further comprising:
    when the summation of a series of low transactions adds up to the threshold within a predefined period of time, then transforming the requests for the series of low transactions into said threshold transaction.

21. The method of claim 1, wherein said requiring at least two verification signatures additionally requires that the first key and the second key be provided within a predefined time period.

22. The method of claim 1, wherein the transfer out of the digital wallet is performed by a cryptocurrency exchange.

23. The method of claim 1, further comprising:
    combining the first key and the second key via an algorithm to return an authorization code; and
    incorporating the authorization code in the authorization of said transfer.

24. The method of claim 1, further comprising:
    establishing a high threshold;
    receiving a high threshold request from the first or second user requesting the security database to enable a high threshold transaction of cryptocurrency out of the digital wallet in an amount above the high threshold, then requesting, by the security database, that the first or second user satisfy a condition, wherein when the condition is satisfied, then providing, by the security database, the private key to enable the high threshold transaction.

25. The method of claim 18, wherein the condition is that the high threshold request is made during a predefined time range.

26. The method of claim 18, wherein the condition is a second out-of-band verification.

27. The method of claim 18, wherein the condition is receipt of verification provided by a third user.

\* \* \* \* \*